United States Patent
Friedlander et al.

(10) Patent No.: US 9,141,924 B2
(45) Date of Patent: Sep. 22, 2015

(54) GENERATING RECOMMENDATIONS FOR STAFFING A PROJECT TEAM

(75) Inventors: Robert R. Friedlander, Southbury, CT (US); James R. Kraemer, Santa Fe, NM (US); Justyna M. Nowak, Chesterbrook, PA (US); Elizabeth V. Woodward, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 13/399,376

(22) Filed: Feb. 17, 2012

(65) Prior Publication Data

US 2013/0218619 A1 Aug. 22, 2013

(51) Int. Cl.
*G06Q 10/00* (2012.01)
*G06Q 10/06* (2012.01)

(52) U.S. Cl.
CPC .............................. *G06Q 10/063112* (2013.01)

(58) Field of Classification Search
CPC .............. G06Q 10/063112; G06Q 10/063118
USPC ................................................. 705/7.12, 7.14
See application file for complete search history.

(56) References Cited

U.S. PATENT DOCUMENTS

| | | | |
|---|---|---|---|
| 5,754,939 A * | 5/1998 | Herz et al. .................... | 455/3.04 |
| 6,460,036 B1 * | 10/2002 | Herz ............................ | 707/748 |
| 6,574,605 B1 * | 6/2003 | Sanders et al. ............... | 705/7.26 |
| 6,601,234 B1 * | 7/2003 | Bowman-Amuah .......... | 717/108 |
| 6,652,283 B1 * | 11/2003 | Van Schaack et al. ........ | 434/236 |
| 7,218,974 B2 * | 5/2007 | Rumi et al. ..................... | 700/28 |
| 7,516,142 B2 | 4/2009 | Friedlander et al. | |
| 7,711,573 B1 * | 5/2010 | Obeid ............................ | 705/321 |
| 7,788,180 B2 * | 8/2010 | Henderson et al. ............. | 705/56 |
| 7,805,382 B2 * | 9/2010 | Rosen et al. ................... | 705/321 |
| 8,099,311 B2 | 1/2012 | La Vecchia et al. | |
| 8,160,918 B1 * | 4/2012 | Blair et al. .................... | 705/7.32 |
| 2002/0091669 A1 * | 7/2002 | Puram et al. ...................... | 707/1 |
| 2003/0088562 A1 * | 5/2003 | Dillon et al. ...................... | 707/5 |
| 2007/0061178 A1 * | 3/2007 | Wilson .............................. | 705/7 |

(Continued)

FOREIGN PATENT DOCUMENTS

JP 2007133664 A * 5/2007

OTHER PUBLICATIONS

US Department of the Interior, Workforce Planning Instruction Manual, Aug. 2001.*

(Continued)

*Primary Examiner* — Timothy Padot
*Assistant Examiner* — George H Walker
(74) *Attorney, Agent, or Firm* — John R. Pivnichny; Law Office of Jim Boice (57) ABSTRACT

A processor-implemented method, system, and/or computer program product generates a recommendation for a worker to be included in a project team. A requisite skill set that is not presently needed, but will be needed in the future, by a project team is determined. Historical data that describe antecedent conditions, which caused a historical worker to obtain the requisite skill set, is received. A candidate worker's current skill set data is adjusted with skill set enhancers, which are available to members of the project team, to generate a predicted future skill set of the candidate worker. In response to the needed requisite skill set matching the predicted future skill set of the candidate worker, a recommendation is generated for adding that candidate worker to the project team.

13 Claims, 8 Drawing Sheets

(56) References Cited

U.S. PATENT DOCUMENTS

| | | | |
|---|---|---|---|
| 2007/0276713 A1 | 11/2007 | Lee et al. | |
| 2008/0183527 A1* | 7/2008 | Deitrich et al. | 705/7 |
| 2009/0006173 A1* | 1/2009 | Farrell et al. | 705/9 |
| 2009/0043621 A1* | 2/2009 | Kershaw | 705/7 |
| 2009/0276231 A1* | 11/2009 | Bazigos et al. | 705/1 |
| 2009/0292581 A1 | 11/2009 | Omiya | |
| 2010/0332496 A1* | 12/2010 | Horvitz et al. | 707/759 |
| 2011/0161139 A1* | 6/2011 | Maheshwari et al. | 705/7.42 |
| 2011/0276507 A1* | 11/2011 | O'Malley | 705/321 |
| 2012/0016875 A1* | 1/2012 | Jin et al. | 707/734 |
| 2012/0203640 A1* | 8/2012 | Karmarkar et al. | 705/14.66 |
| 2012/0316912 A1* | 12/2012 | Agarwal et al. | 705/7.22 |
| 2013/0111357 A1* | 5/2013 | McCormack et al. | 715/753 |

OTHER PUBLICATIONS

Jochen Malinowski, Tim Weitzel, Tobias Keim, Decision support for team staffing: An automated relational recommendation approach, Decision Support Systems, vol. 45, Issue 3, Jun. 2008, pp. 429-447, ISSN 0167-9236, http://dx.doi.org/10.1016/j.dss.2007.05.005.*

Yixin Diao; Heching, A., "Staffing optimization in complex service delivery systems," Network and Service Management (CNSM), 2011 7th International Conference on , vol., no., pp. 1,9, Oct. 24-28, 2011.*

Topology map Google Image Search Dec. 10, 2013.*

\* cited by examiner

GENERATING RECOMMENDATIONS FOR STAFFING A PROJECT TEAM

BACKGROUND

The present disclosure relates to the field of computers, and specifically to the use of computers when staffing a project team to work on one or more projects. Still more particularly, the present disclosure relates to the use of computers in identifying a best candidate worker needed at a future time in the project.

A project is made up of a planned set of activities, which lead to a desired result and/or product. For example, a project may be created to deliver a software program, to construct a building, to open a new office, etc. The project is executed by a combination of non-human resources (e.g., equipment, computer systems, raw materials, etc.) and human resources (i.e., workers).

SUMMARY

A processor-implemented method, system, and/or computer program product generates a recommendation for a worker to be included in a project team. A requisite skill set that is not presently needed, but will be needed in the future, by a project team is determined. Historical data that describe antecedent conditions, which caused a historical worker to obtain the requisite skill set, is received. A candidate worker's current skill set data is adjusted with skill set enhancers, which are available to members of the project team, to generate a predicted future skill set of the candidate worker. In response to the needed requisite skill set matching the predicted future skill set of the candidate worker, a recommendation is generated for adding that candidate worker to the project team.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
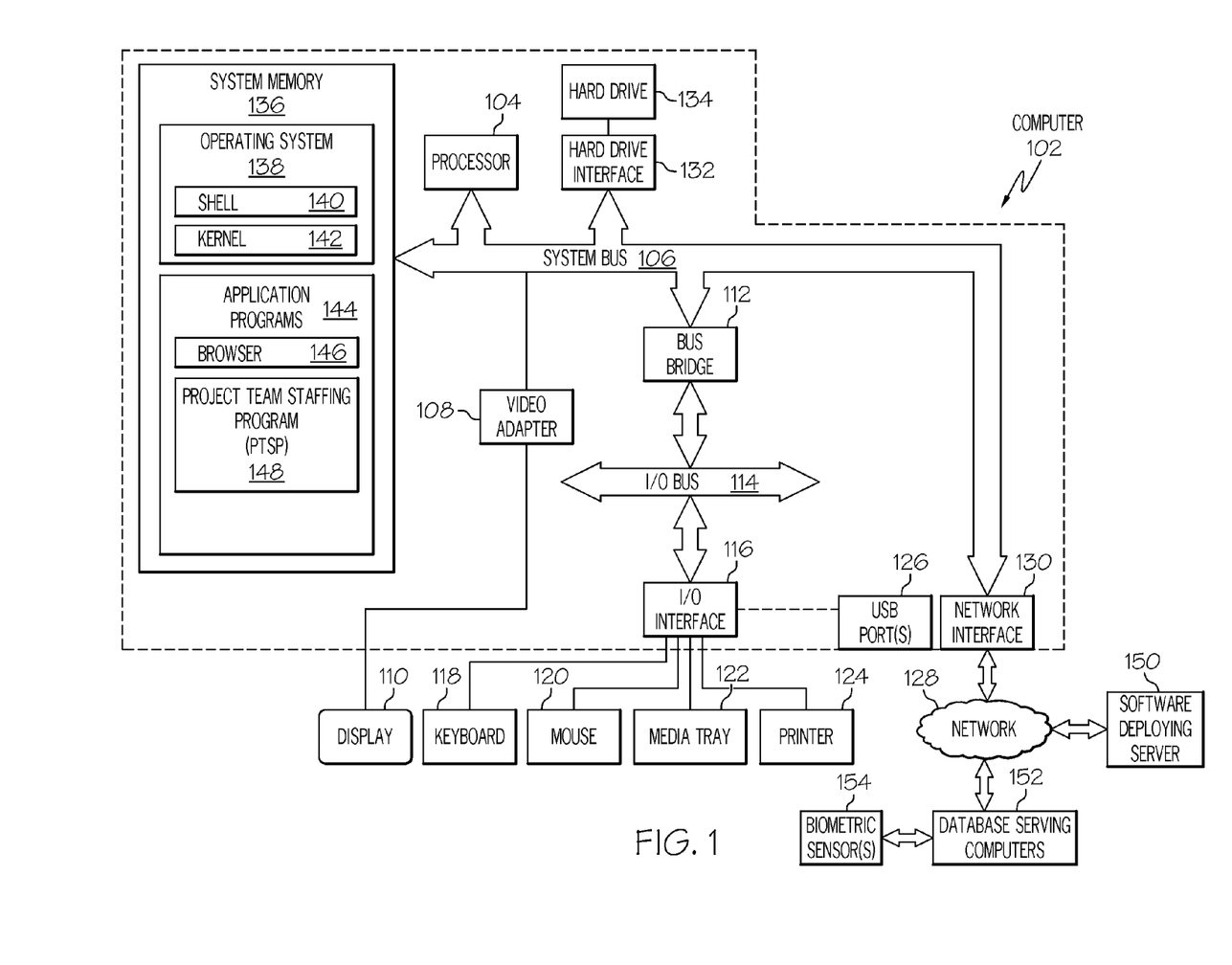
FIG. 1 depicts an exemplary system and network which may be used to implement the present invention.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or database serving computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, as well as database serving computer(s) 152, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a project team staffing program (PTSP) 148. PTSP 148 includes code for implementing the processes described below, including those described in FIGS. 2-8. In one embodiment, computer 102 is able to download PTSP 148 from software deploying server 150, including in an on-demand basis, wherein the code in PTSP 148 is not downloaded until needed for execution. Note further that, in one embodiment of the present invention, software deploying server 150 performs all of the functions associated with the present invention (including execution of PTSP 148), thus freeing computer 102 from having to use its own internal computing resources to execute PTSP 148.

Also coupled to computer 102, either directly or as depicted via the database server computer(s) 152, are biometric sensors 154. Biometric sensors 154 are devices that gather biometric data associated with a human, such as a candidate worker. Biometric data is data describing a physiological state, physical attribute, or measurement of a physiological condition. Biometric data may include, without limitation, fingerprints, thumbprints, palm prints, footprints, heart rate, retinal patterns, iris patterns, pupil dilation, blood pressure, respiratory rate, body temperature, blood sugar levels, and any other physiological data. Biometric sensors 154 are one or more of, without limitation, a fingerprint scanner, a palm scanner, a thumb print scanner, a retinal scanner, a iris scanner, a wireless blood pressure monitor, a heart monitor, a thermometer or other body temperature measurement device, a blood sugar monitor, a microphone capable of detecting a heartbeat and/or breath sounds, a breathalyzer, and/or any other type of biometric device.

One exemplary biometric sensor (from biometric sensors 154) is an iris scanner. When a person is being interviewed for a position on a project team, a biometric scanner can measure iris responses (i.e., contraction, enlargement, fluctuation, etc. across various time periods) to questions regarding the person's interest/enthusiasm for the project that is being populated by the project team. These iris responses are digitized and then compared with a databank of various stored iris responses. This databank holds known patterns that indicate interest, boredom, etc. in response to particular questions.

These questions may be general questions, such that the boredom/interest is question-independent, or the question may be project-specific. In one embodiment, the stored responses are in response to specific questions related to a specific project and the project team being populated for that specific project. By comparing the candidate worker's iris responses to questions about the project to known iris response patterns, both the interviewer and the candidate are able to gauge the actual level of interest held by the candidate worker. For example, if a candidate worker is asked about a particular technical area, genuine interest in this technical area may be indicated by pupil dilation/fluctuation, while lack of interest in this particular technical area may be indicated by no change to pupil dilation levels.

Another exemplary biometric sensor (from biometric sensors 154) is a voice stress analyzer. When a person is being interviewed for a position on a project team, a voice stress analyzer can measure changes in voice patterns (i.e., higher/lower pitch, changes in tempo, etc. across various time periods) to questions regarding the person's interest/enthusiasm for the project that is being populated by the project team. These voice pattern responses are digitized and then compared with a databank of various stored voice patterns. This databank holds known patterns that indicate interest, boredom, etc. in response to particular questions. These particular questions may be general questions, such that the boredom/interest is question-independent. In one embodiment, the stored responses are in response to specific questions related to a specific project and the project team being populated for that specific project. By comparing the candidate worker's voice patterns to questions about the project to known voice patterns, both the interviewer and the candidate are able to gauge the actual level of interest, for the project and/or technology areas of the requisite skill set, held by the candidate worker.

With reference still to FIG. 1, note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
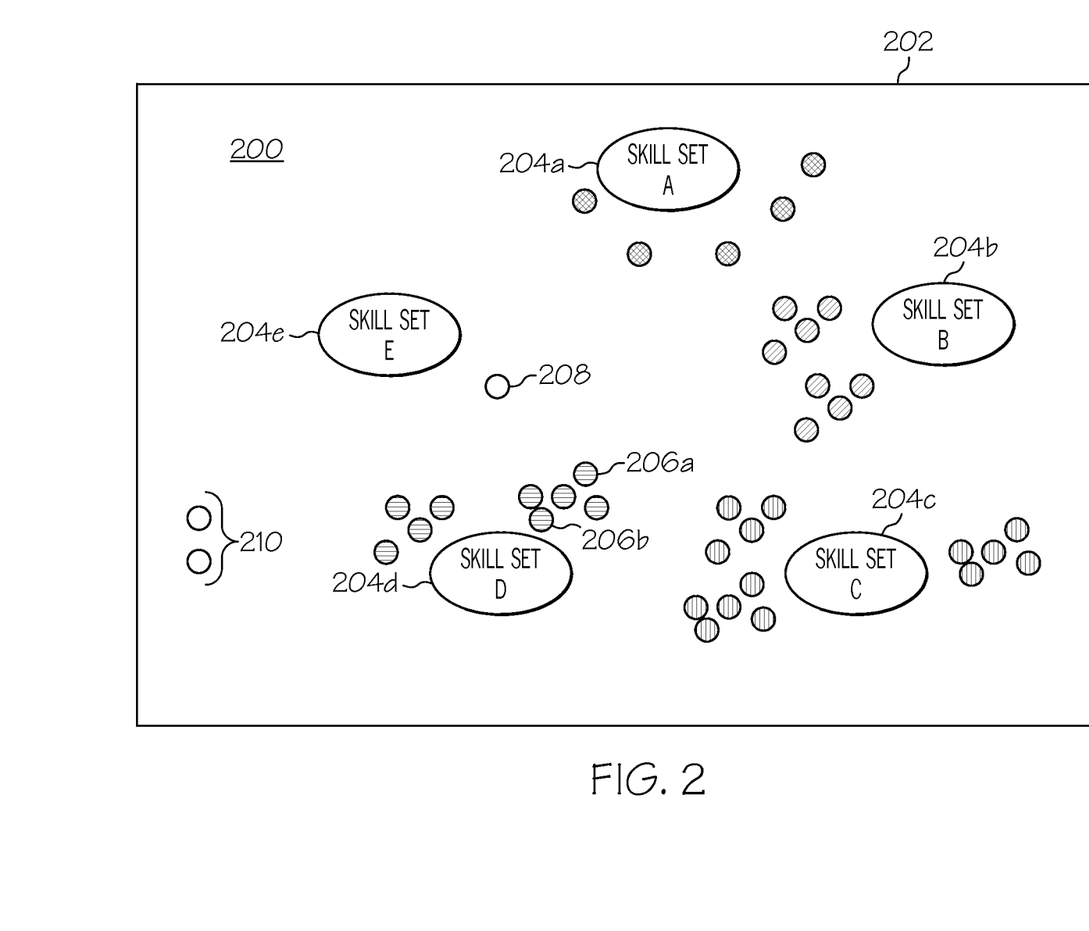
FIG. 2 illustrates an exemplary predicted team skills topology map.

Referring now to FIG. 2, an exemplary predicted team skill topology map 200, which is displayed on a Graphical User Interface (GUI) 202, is presented. The predicted team skill topology map 200 depicts skill sets A-E (skill icons 204a, 204b, 204c, 204d, and 204e) that one or more members of a project team are predicted to possess at a future time period in one or more projects to which the project team is/will be assigned. That is, one member of a project team may be able to perform certain skills (i.e., has skill set A, represented by skill icon 204a), while another member of the project team will have skill set B (represented by skill icon 204b), etc. Alternatively, one member of the project team may have skill sets A and B (represented by skill icons 204a and 204b). Alternatively, two or more members of the project team may have a same skill set (e.g., skill set C, represented by skill icon 204c).

As stated above, each skill set depicted in FIG. 2 may be possessed by multiple project team members. However, for exemplary purposes, assume that each skill set depicted by the skill icons 204a-204e in the predicted team skill topology map 200 will belong, in the future, to a single member of the project team. Each skill set is depicted with one or more skill dots positioned at various proximities to a skill set. For example, consider skill set D, represented by skill icon 204d. As depicted, there are multiple skill dots about (i.e., depicted as being proximate to) the skill icon 204d. Two of these skill dots are skill dot 206a and skill dot 206b. As depicted, skill dot 206a is farther from skill icon 204d than skill dot 206b. This difference in distance is due to the underlying fact that, with regards to skill set D, skill set data represented by skill dot 206a is not as significant as the skill set data related to skill dot 206b. For example, assume that skill dot 206a and skill dot 206b both describe how many times keywords related to skill set D appear in two different documents. In the first document (associated with skill dot 206a), these keywords may appear ten times, while in the second document (associated with skill dot 206b) they appear fifty times. In this example, the second document provides more evidence of the worker's skills/interests/experience/education related to skill set D than the first document. Thus, skill dot 206b (associated with the second document) is portrayed closer to the skill set icon 204d than skill dot 206a.

Note that each of the skill dots depicted in FIG. 2 are associated with a single worker for each skill set, or alternatively each of the skill dots are associated with multiple workers for each skill set. For example, the skill dots (depicted as having a hatch fill appearance) surrounding skill set icon 204a may all be associated with a single worker from the project team, or they may be associated with multiple workers from the project team.

As shown in the example depicted by team skill topology map 200 in FIG. 2, there are numerous skill dots around each of the skill set icons 204a-204d, but only one skill dot 208, associated with skill set icon 204e, for skill set E. Similarly, the two skill dots 210 are so far from skill set icon 204e that they are insignificant (i.e., they represent very minimal interest in skill set E). This unpopulated area on the predicted team skill topology map 200 indicates that the project team is lacking a worker who has significant skills related to skill set E. In accordance with one embodiment of the present invention, these significant skills are not presently needed, but have been predetermined to be needed by the project team, for one or more projects, in the future. That is, in one embodiment the predicted team skill topology map 200 of FIG. 2 shows which skill sets will be available at a future predetermined time period in the project, not which skill sets are currently available. The currently available skill sets and the predicted future skill sets, even for current workers on the project team, will differ from each other (i.e., the currently available skill sets will be different from the predicted future skill sets) for various reasons, including known retirement/relocation/vacation plans of team members, anticipated training/experience that will be gained by members of the project team, etc. Thus, in this embodiment, team skill topology map 200 indicates the predicted skill set levels of current project team members, less any members who are predicted to be lost from the project team.

Figure 3:
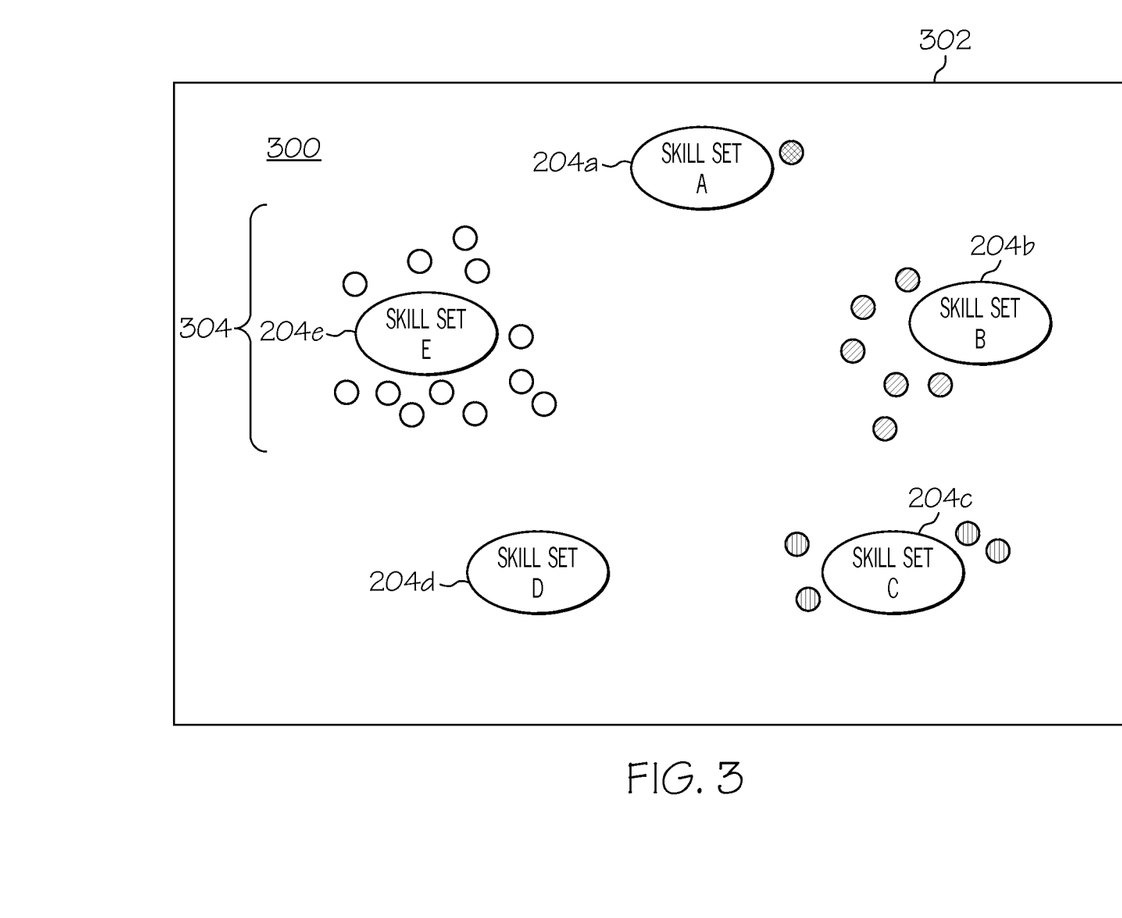
FIG. 3 depicts an exemplary candidate worker's predicted skill topology map.

Referring now to FIG. 3, a candidate worker's predicted skill topology map 300 is depicted on a GUI 302 (which may be the same GUI or a different GUI from the GUI 202 depicted in FIG. 2). As suggested by the numerous skill dots 304 surrounding the skill set icon 204e, the candidate worker whose skill sets are depicted by candidate worker's predicted skill topology map 300 is predicted to have, at a predetermined future time period of the project, an extensive background (i.e., education, publications, work experience, credentials, etc.) related to skill set E (represented by icon 204e). In addition, this particular candidate worker is predicted to have a significant background in skill B (represented by icon 204b) as well. This candidate, as represented by the various skill dots, will have some experience related to skill C, only minimal experience related to skill A, and no experience related to skill D. These predicted future skill sets for the candidate worker are based on known trajectories of other workers.

In one embodiment, predicting the predicted future skill sets that the candidate worker will possess at some future time period in the project is performed by identifying a final product of the current project. For example, the final project may be a software accounting program for a car dealership. A processor in a computer (e.g., computer 102 shown in FIG. 1) then locates a past project that produced a same type of final product as the current project. The processor identifies all past requisite skill sets (e.g., expertise in a certain software language, expertise in integrating new hardware into legacy systems, etc.) used by team members working on the past project to produce this same type of software accounting program. Based on this information, the processor is then able to determine which requisite skill set will be needed in the future by the current project team by identifying which skill set, from the past requisite skill sets, is absent from the current and/or predicted future skill sets that are held by members of the current project team.

Figure 4:
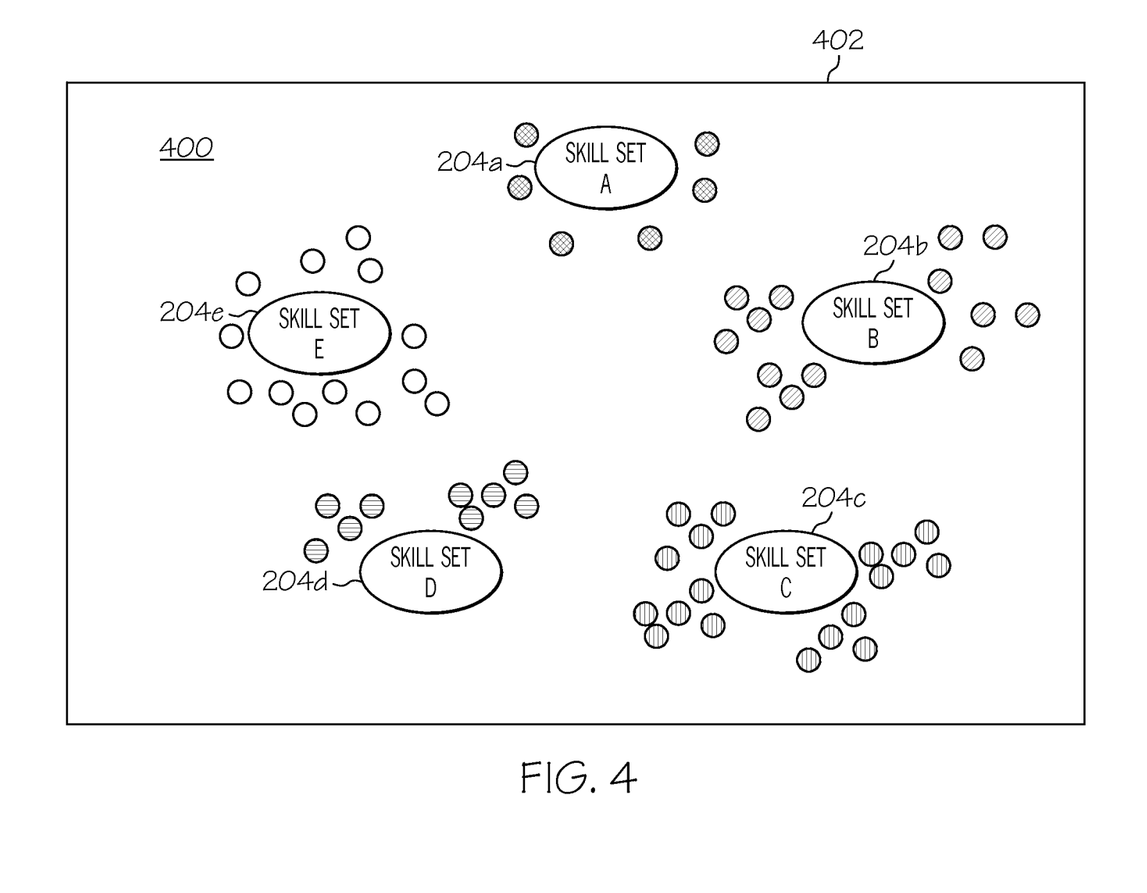
FIG. 4 illustrates a predicted combined team skills topology map that is generated by overlaying the candidate worker's predicted skill topology map of FIG. 3 over the predicted team skills topology map of FIG. 2.

With reference now to FIG. 4, a predicted combined team skills topology map 400 depicts the candidate worker's predicted skill topology map 300 of FIG. 3 being overlaid on the predicted team skill topology map 200 of FIG. 2. As depicted by the placement of the various types of skill icons in the predicted combined team skills topology map 400, all Skill Sets A-E will be provided by the project team in the future if the candidate worker described in the candidate worker's predicted skill topology map 300 of FIG. 3 is currently added to the project team, in order to allow her to develop her skills according to skill set enhancers (e.g., education, experience, mentoring, etc.) that are available to team members. However, because the candidate worker has, or will have, skills related to Skill Set B and Skill Set C (as depicted in FIG. 3), these skill sets may be in over-abundance in the future, which may not be a cost effective distribution of workers. Therefore, another candidate worker having the same needed skills from Skill Set E as the candidate worker described in FIG. 3, but without the skills related to Skill Set B and/or Skill Set C, may be a better fit to the future needs of the project team.

While the graphs shown in FIGS. 2-4 are useful in scenarios in which there only a limited number of skill dots to be graphed, in other scenarios there is too much data to clearly be represented by such skill dots. Similarly, certain skill sets are a combination of two or more skill sets. In order to depict and/or process such skill sets (in which there are too many skill dots and/or a skill set is a combination of two or more skill sets), a globule topology map is used. For example, consider the candidate worker's predicted skill globule topology map 500 shown in FIG. 5. The Skill Sets A-E are connected by visual indicators, such as line 502, which is a visual indicator that indicates that there may be skill sets that include both Skill Set A as well as Skill Set E. A globule 504, which is an exemplary combination graphic figure that depicts a combination of Skill Set A and Skill Set E, is displayed at a processor-determined position on line 502. Since the globule 504 is very close to skill set icon 204*e* compared to skill set icon 204*a*, this indicates that the worker/workers who have/will have this skill set combination have/will have much more of the skill from Skill Set E than Skill Set A.

Figure 5:
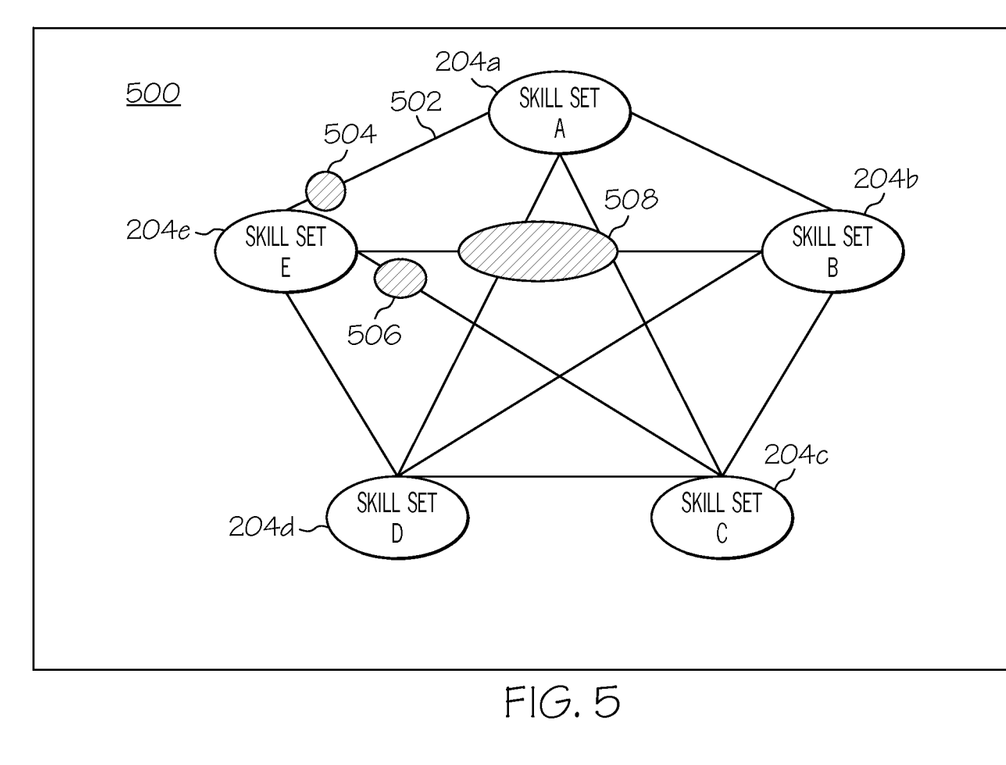
FIG. 5 depicts an exemplary candidate worker's predicted skill globule topology map.

Similarly, globule 506, which is larger than globule 504, indicates that a candidate worker/set of workers has more combined skills from Skill Set E and Skill Set C. Furthermore, since globule 506 is close to skill icon 204*e*, the candidate worker's predicted skill globule topology map 500 shows that this candidate worker/set of workers will have even more skills from Skill Set E. Furthermore, globule 508 indicates that this candidate worker/set of workers has even more skills from Skill Set E, although many of the skills represented by globule 508 are due to skills from Skill Set B.

Figure 6:
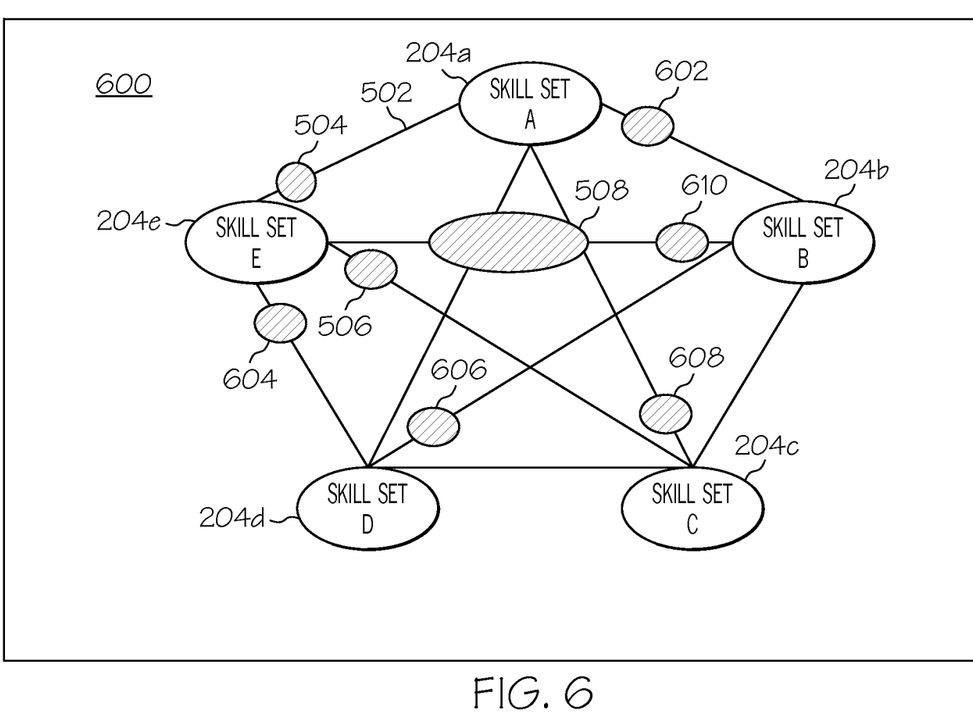
FIG. 6 illustrates an exemplary predicted combined team skills globule topology map.
Figure 7:
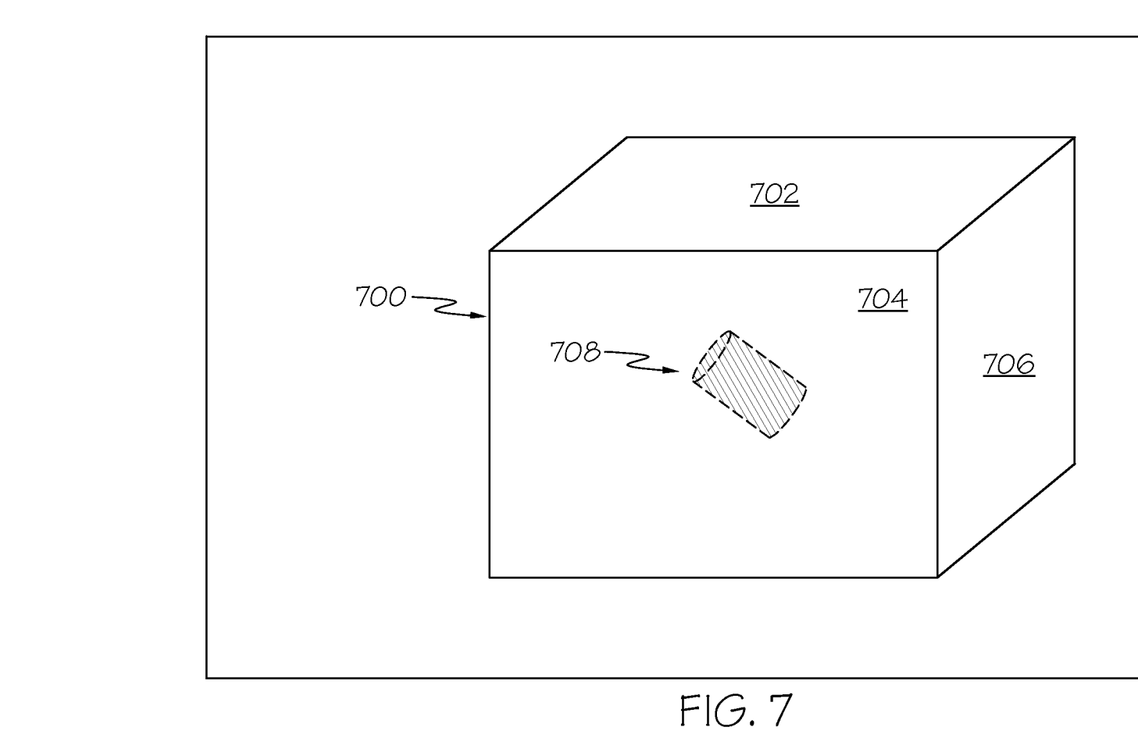
FIG. 7 depicts an exemplary multi-dimensional topology map.

With reference now to FIG. 6, a predicted combined team skills globule topology map 600 shows various skill levels that are predicted to be possessed by a project team in the future. Predicted combined team skills globule topology map 600 contains not only globules 504, 506, and 508 for the candidate worker (from FIG. 5), but also globules 602, 604, 606, 608, and 610 representing predicted skill levels for current project team members.

While the maps shown in FIGS. 2-6 are useful in visualizing skill level predictions, note that these figures only contemplate the relationships between two dimensions (skill sets). However, in one embodiment, three or more dimensions are utilized. For example, consider a scenario in which there is an interplay between three Skill Sets, depicted in multi-dimensional topology map 700 in FIG. 7. Three skill sets are represented by side 702, side 704, and side 706 of the multi-dimensional topology map 700. A candidate worker and/or a project team member(s) may have a skill set that is a combination of these three skill sets, as depicted by multi-dimensional globule 708, in which the positioning and size of the multi-dimensional globule 708 are determined by the relative skill levels of the three skill sets. That is, the mapping of the multi-dimensional globule 708 is performed in an analogous manner as described in FIG. 6.

Consider now a multi-dimensional globule that reflects simultaneous combinations of skill sets, varying skill set requirements, etc. that exceed three dimensions, and/or take into account varying needs at different points in time of a project. This multi-dimensional globule is not depicted in the figures of the present patent application, since they exceed three dimensions, and thus cannot be visualized in a single drawing. In this embodiment, all operations and analysis (i.e., determining future project needs, predicting future skill sets for a candidate worker and current project team members, etc.) are only performed by a processor capable of operating in dimensions beyond three-dimensions. For example, assume that there are twenty parameters that must be considered in order to determine what the candidate worker's future skill set will include, and/or what the skill set needs of the project team will be. These multi-dimensional (i.e., more than three) parameters cannot be visually depicted or envisioned in normal two/three dimension space, and thus are within the exclusive purview of a computer system.

Figure 8:
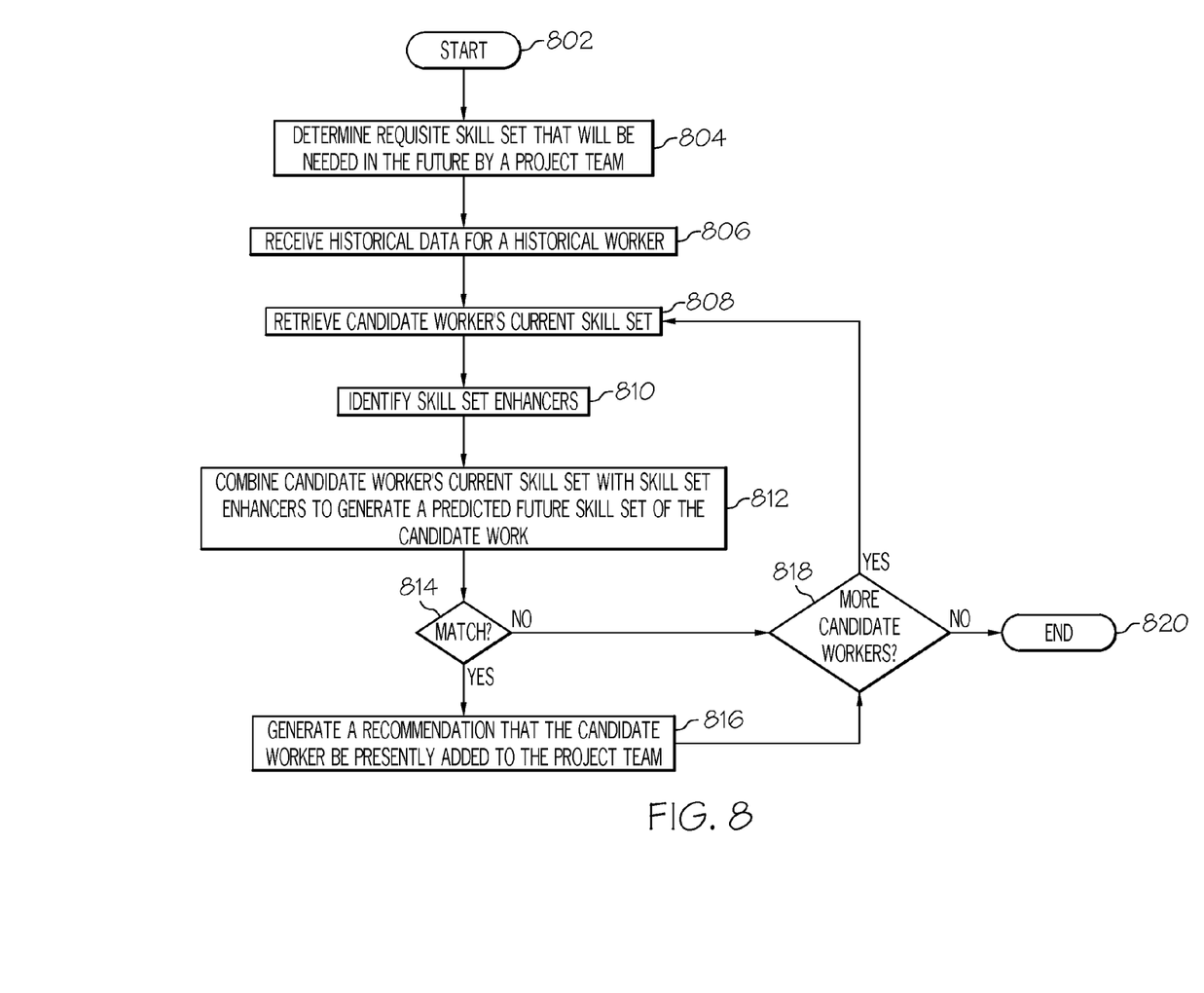
FIG. 8 is a high level flow chart of one or more exemplary steps taken by a processor to generate a recommendation for a worker to be included in a project team.

With reference now to FIG. 8, a high-level flow chart of one or more exemplary steps taken by a processor to generate a recommendation for a worker to be included in a project team is presented. After initiator block 802, a determination of a requisite skill set that will be needed in the future by a project team for a current project is determined (block 804). In one embodiment, this determination is made by a processor based on a comparison of similar projects, and projecting out future needs of the current project. This project team includes one or more workers on a project. The requisite skill set will be needed at a future time during the project, but is not presently needed by the project team. Thus, the present invention is not directed to current staffing needs, but rather is directed to future staffing needs.

Note that in one embodiment, the project team is currently populated with other workers. In this embodiment, the processor determines the requisite skill set that will be needed in the future by the project team by first graphing data that describe skill sets held by the other workers onto a team skill topology map (e.g., as depicted in FIG. 2). As described herein, the requisite skill set is determined/identified by identifying an unpopulated area on the team skill topology map, thus indicating which future skill sets will be needed.

In one embodiment, the project is a current project, the project team is a current project team, and determining the requisite skill set that will be needed in the future by the current project team is performed by the processor identifying a final product of the current project. The processor then locates a past project that produced a same type of product as the final product as the current project. The processor then identifies all past requisite skill sets used by the past project to produce said same type of product. The processor then determines the requisite skill set that will be needed in the future by the current project team by identifying which skill set, from said all past requisite skill sets, is absent from current skill sets that are currently held by members of the current project team. For example, assume that a past project produced red widgets. The current project will be producing widgets that, although they may be blue widgets, are still a same type of product as red widgets. By examining what skills were needed to produce the red widgets during various time points during the past project, the processor can determine what skill sets are needed to produce the blue widgets during each of these time points. The processor then predicts which skill sets will be available to the project team in the future, particularly at these time points. Note that, in some embodiments, the project is currently in progress, while in other embodiments the project has yet to begin. In either scenario, however, it is the prediction of future skill needs and filling those skill needs that the present invention addresses.

As described in block 806, the processor then receives historical data that describe antecedent conditions for a historical worker. In one embodiment, this historical data is a set of binary historical data, which is "1's" and "0's". Thus, this binary data is in a format that is unintelligible to a human, and is only readable/understood by a processor. In one embodiment, this binary data is streamed at a rate that is too fast for human capture/comprehension, and thus can only be captured/processed by a processor. The antecedent conditions for the historical worker have been predetermined to have caused the historical worker to obtain the requisite skill set. For example, assume that a historical worker (i.e., other than a candidate worker for a project team) has a certain skill set. This worker presumably was not born with these skills, but rather had certain education, work experience, mentoring, etc. that led her to achieve these skills. Thus, the historical worker's final skill set is the result of both previous skills as well as enhancement opportunities that she subsequently took advantage of.

With reference then to block 808, the processor retrieves a candidate worker's skill set data that identify a current skill set of a candidate worker. In one embodiment, this candidate worker's skill set data is a candidate worker's skill set binary data, which is in a binary ("1's" and "0's") format that is only understood by a processor. In one embodiment, this binary data is streamed at a rate that is too fast for human capture/comprehension, and thus can only be captured/processed by a processor. The current skill set of the candidate worker may include her education, credentials, work experience, writings, stated interests, etc. That is, the current skill set is a combination of knowledge and attitude. In one embodiment, the candidate worker's skill set is identified by data from a social network repository. This social network repository may also provide data describing the historical data that describe antecedent conditions for the historical worker described in block 806. This social network repository, which can be accessed from database serving computer(s) 152 shown in FIG. 1, include social network web postings, text messages, Internet video postings, etc. that the worker has posted in the past. In one embodiment, the stated interests of the candidate worker are identified according to a percentage of occurrences of a predefined word in time-weighted historical writings of the candidate worker. For example, assume that the candidate worker has posted articles about a particular subject, and has used a particular keyword or phrase (i.e., "blue widget") ten times in a single page document. This document would carry more weight than a document, posted by another candidate, which was 100 pages long, but still only had ten occurrences of the term "blue widget". Thus, the first candidate worker would be determined to be a better fit for a project that will be making blue widgets. In one embodiment, more recent historical writings are given greater weight that older historical writings. Thus, a candidate who wrote extensively about blue widgets just last week would be deemed a stronger candidate that another candidate who last wrote about blue widgets a decade ago, since the other candidate apparently has lost interest in blue widgets.

As indicated in block 810, the processor then identifies skill set enhancers that are available to members of the project team. Examples of such skill set enhancers include, but are not limited to, work experience that the candidate will receive by joining the project team; mentoring that will be provided by other members of the project team; continuing education opportunities available to project team members; etc. As indicated in block 812, when these skill set enhancers are combined with the current skill set of the candidate worker by the processor, a predicted future skill set of the candidate worker can be predicted. Therefore, based on past historical data and experiences, an accurate prediction can be made as to what skills a particular worker will have in the future by looking at what skills she currently has, and then predicting how these skills will be enhanced by particular skill set enhancers. In one embodiment, this prediction is made by comparing the current state of the candidate worker to where a historical worker was situated before being exposed to the same skill set enhancers. For example, assume that the historical worker and the candidate worker both had skill set "X". Assume further that the historical worker took advantage of skill set enhancers "Y", and two years later had improved skill set "Z". An assumption is made that the current candidate worker will also have improved skill set "Z" in two years if she also takes advantage of the same skill set enhancers "Y".

Thus, as indicated in query block 814, if the historical worker and the current candidate have the same previous skill set and skill set enhancers, and the historical worker ended up having the requisite skill set needed by the current project team in the future (e.g., in two years), then the processor will generate a recommendation that the candidate worker be presently added to the project team, in order to give her time to develop the needed/requisite skill set (block 816). If the combination of the current candidate worker's skill and skill set enhancers does not produce a predicted future skill set that matches what the historical worker had (query block 814), then a query is made to determine if there are other candidates to evaluate (query block 818). If not, then the process ends (terminator block 820).

As described herein, in one embodiment the processor graphs the candidate skill set data onto a candidate worker's skill topology map (see FIGS. 4 and 6). If the candidate worker's skill topology map fills the unpopulated area of the team skill topology map beyond a predetermined fill level, then the processor generates a recommendation that the candidate worker be included in the project team, either at the present time (in order to allow her time to develop the requisite skill set that will be needed in the future), or in the future when the requisite skill set is actually needed.

In one embodiment, and particularly as described in FIG. 5-6, the requisite skill set is a combination of at least two skill sets. For example, the combination of skill sets may include a first skill level for a first skill and a second skill level for a second skill. As depicted in FIGS. 5-6, the processor displays a visual connector between a first skill icon and a second skill icon on the candidate worker's skill topology map. Note that the first skill icon represents the first skill and the second skill icon represents the second skill needed in the future by the project team. The processor generates a combination graphic figure (e.g., a globule) that graphically depicts a combination of at least two skill sets possessed by the candidate worker. The processor then displays the combination graphic figure at a processor-determined position on the visual connector. This processor-determined position indicates how skilled the candidate worker is in the first skill compared to the second skill.

In one embodiment, the requisite skill set again is made up of multiple skills. In this embodiment, the processor applies a different weighting value, from multiple weighting values, to each of the multiple skills to create a weighted requisite skill set. The processor applies the different weighting value, from the multiple weighting values, to each of the multiple skills in the predicted future skill set of the candidate worker to create a candidate worker's predicted weighted skill set. The processor then recommends a best candidate worker from a pool of candidate workers, where the best candidate worker possesses a predicted weighted skill set that best matches the weighted requisite skill set.

For example, assume that the requisite skill set is made up of skill set X, skill set Y, and skill set Z. Assume also that skill set X has been determined to be the most important for a particular project, and thus has a weighting of 0.5, while skill set Y has a weighting of 0.25 and skill set Z has a weighting of 0.10 for this particular project. Now assume that there are two candidate workers, each of whom has skill sets X, Y and Z, but at different skill levels. That is, assume that the first candidate has a skill level of 10 for skill set X, and a skill level of 5 for both skill sets Y and Z. Assume further that a second candidate has a skill level of 5 for skill level X, but a skill level of 8 for both skill sets Y and Z. Thus, the first candidate's combined weighted skill level is 10(0.5)+5(0.25)+5(0.10)=6.75. The second candidate's combined weighted skill level is 5(0.5)+8(0.25)+8(0.10)=5.30. Thus, the first candidate is better suited for the current/future project, even though her overall skill level (10+5+5=20) is lower than the overall skill level of the second candidate (5+8+8=21). If, however, the weighting values were all equal (e.g., 1.0), then the candidate with the highest overall raw skill set score would be the higher-recommended candidate for inclusion in the project team.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A processor-implemented method of generating a recommendation for a worker to be included in a project team, the processor-implemented method comprising:
   determining a requisite skill set that will be needed at a future time by a project team, wherein the project team comprises workers on a project, and wherein the requisite skill set is not presently needed by the project team;
   determining the requisite skill set by:
      identifying a final product of a current project;
      locating a past project that produced a same final product as the current project;
      identifying all past requisite skill sets used by the past project to produce said same final product; and
      determining the requisite skill set that will be needed at the future time by the current project team by identifying which skill set, from said all past requisite skill sets, is absent from current skill sets that are currently held by members of the current project team;

identifying, by a processor, sources of information that provide evidence of a particular person's skill from the requisite skill set;

determining, by the processor, a level of evidence that each of the sources of information provides regarding the particular person's skill from the requisite skill set;

graphing, by the processor, data that describe skill sets held by the other workers onto a team skill topology map, wherein the team skill topology map comprises a skill icon surrounded by one or more skill dots, wherein the skill icon represents the requisite skill set that will be needed at the future time by the project team, wherein the one or more skill dots represent said each of the sources of information describing the particular person's skill from the requisite skill set, and wherein a distance between the skill icon and a particular skill dot represents the level of evidence of the particular person's skill from the requisite skill set, such that sources of information that are depicted by skill dots that are close to the skill icon are predetermined to provide stronger evidence of the particular person's skill than sources of information that are depicted by skill dots that are farther away from the skill icon than the skill dots that are close the skill icon;

identifying the requisite skill set by identifying an unpopulated area on the team skill topology map;

receiving a set of binary historical data that describes antecedent conditions for a historical worker, wherein the set of binary historical data is received by the processor, and wherein the antecedent conditions have been predetermined to have caused the historical worker to obtain the requisite skill set;

retrieving, by the processor, a candidate worker's skill set binary data that identifies a current skill set of a candidate worker;

identifying skill set enhancers that are made available to members of the project team in response to joining the project team, wherein the skill set enhancers comprise work experience and mentoring from other members of the project team that are provided by working on the project;

retrieving, by the processor, from one or more biometric sensors coupled to the candidate worker, physiological response generated in response to the candidate worker being asked particular questions related to the project;

identifying, by the processor, an interest level for the project by the candidate worker based on the physiological responses generated in response to the candidate worker being asked the particular questions related to the project, wherein the interest level is determined by comparing the physiological response from the candidate worker with known physiological responses to the particular questions related to the project;

identifying stated interests of the candidate worker by comparing the physiological responses from the candidate worker with the known physiological responses, wherein the physiological responses from the candidate worker and the known physiological responses are produced by biometric sensors that monitor workers, and wherein the known physiological responses are produced by known responses to questions regarding the stated interests of the candidate worker;

combining, by the processor, the current skill set of the candidate worker with the skill set enhancers and the stated interests of the candidate worker and the interest level for the project by the candidate worker to generate a predicted future skill set of the candidate worker;

in response to matching the requisite skill set to the predicted future skill set of the candidate worker, the processor generating a recommendation that the candidate worker be presently added to the project team.

2. The processor-implemented method of claim 1, further comprising:
graphing, by one or more processors, the candidate worker's skill set binary data onto a candidate worker's skill topology map;
displaying, by one or more processors, the candidate worker's skill topology map on a video display; and
generating, by one or more processors, the recommendation that the candidate worker be included in the project team in response to the candidate worker's skill topology map filling the unpopulated area of the team skill topology map beyond a predetermined fill level.

3. The processor-implemented method of claim 1, further comprising the processor:
graphing, by one or more processors, the candidate worker's skill set binary data onto a candidate worker's skill topology map;
displaying, by one or more processors, the candidate worker's skill topology map on a video display; and
generating, by one or more processors, the recommendation that the candidate worker be included in the project team in response to the candidate worker's skill topology map filling the unpopulated area of the team skill topology map beyond a predetermined fill level.

4. The processor-implemented method of claim 1, wherein the requisite skill set comprises multiple skills, and wherein the processor-implemented method further comprises the processor:
applying a different weighting value, from multiple weighting values, to each of the multiple skills to create a weighted requisite skill set;
applying said different weighting value, from said multiple weighting values, to each of the multiple skills in the predicted future skill set of the candidate worker to create a candidate worker's predicted weighted skill set; and
recommending a best candidate worker from a pool of candidate workers, wherein the best candidate worker possesses a predicted weighted skill set that best matches the weighted requisite skill set.

5. The processor-implemented method of claim 4, wherein all of said multiple weighting values are equal to one another.

6. The processor-implemented method of claim 1, wherein the project is currently in progress.

7. The processor-implemented method of claim 1, wherein the project is currently not in progress, and wherein the project is scheduled to begin at a future date.

8. The processor-implemented method of claim 1, further comprising the processor:
retrieving the historical data and the candidate worker's skill set binary data from a social network repository.

9. The processor-implemented method of claim 1, further comprising the processor:
identifying the candidate worker's skill set binary data as a combination of identified work experience, education, credentials, and stated interests of the candidate worker.

10. The processor-implemented method of claim 9, further comprising the processor:

identifying the stated interests of the candidate worker according to a percentage of occurrences of a predefined word from a single document from time-weighted historical writings of the candidate worker, wherein the percentage of occurrences is a ratio of occurrences of the predefined word to occurrences of all other words within the single document, and wherein more recent historical writings are given greater weight than older historical writings.

11. A computer program product for generating a recommendation for a worker to be included in a project team, the computer program product comprising:
a computer readable non-transitory storage media with program instructions, which cause a processing unit to:
determine a requisite skill set that will be needed in a future time by a project team, wherein the project team comprises workers on a project, and wherein the requisite skill set is not presently needed by the project team determining the requisite skill set by:
identify a final product of a current project;
locate a past project that produced a same final product as the current project;
identify all past requisite skill sets used by the past project to produce said same final product; and
determine the requisite skill set that will be needed at the future time by the current project team by identifying which skill set, from said all past requisite skill sets, is absent from current skill sets that are currently held by members of the current project team, and
identify, by the processor, sources of information that provide evidence of a particular person's skill from the requisite skill set;
determine, by the processor, a level of evidence that each of the sources of information provides regarding the particular person's skill from the requisite skill set;
graph data that describe skill sets held by the other workers onto a team skill topology map, wherein the team skill topology map comprises a skill icon surrounded by one or more skill dots, wherein the skill icon represents the requisite skill set that will be needed at the future time by the project team, wherein the one or more skill dots represent said each of the sources of information describing the particular person's skill from the requisite skill set, and wherein a distance between the skill icon and a particular skill dot represents the level of evidence of the particular person's skill from the requisite skill set, such that sources of information that are depicted by skill dots that are close to the skill icon are predetermined to provide stronger evidence of the particular person's skill than sources of information that are depicted by skill dots that are farther away from the skill icon than the skill dots that are close the skill icon;
identify the requisite skill set by identifying an unpopulated area on the team skill topology map;
receive historical data that describe antecedent conditions for a historical worker, wherein the antecedent conditions have been predetermined to have caused the historical worker to obtain the requisite skill set;
retrieve a candidate worker's skill set data that identify a current skill set of a candidate worker;
identify skill set enhancers that are made available to members of the project team in response to joining the project team, wherein the skill set enhancers comprise work experience and mentoring from other members of the project team that are provided by working on the project;

identify the stated interests of the candidate worker by comparing physiological responses from the candidate worker with known physiological responses, wherein the physiological responses from the candidate worker and the known physiological responses are produced by biometric sensors that monitor workers, and wherein the known physiological responses are produced by known responses to questions regarding the stated interests of the candidate worker; combine the current skill set of the candidate worker with the skill set enhancers and the stated interests of the candidate to generate a predicted future skill set of the candidate worker;
in response to matching the requisite skill set to the predicted future skill set of the candidate worker, generate a recommendation that the candidate worker be presently added to the project team.

12. A computer program product for generating a recommendation for a worker to be included in a project team, the computer program product comprising:
a computer readable non-transitory storage media with program instructions, which cause a processing unit to:
determine a requisite skill set that will be needed in a future time by a project team, wherein the project team comprises workers on a project, and wherein the requisite skill set is not presently needed by the project team;
determine the requisite skill set by:
identifying a final product of a current project;
locating a past project that produced a same final product as the current project;
identifying all past requisite skill sets used by the past project to produce said same final product; and
determining the requisite skill set that will be needed at the future time by the current project team by identifying which skill set, from said all past requisite skill sets, is absent from current skill sets that are currently held by members of the current project team;
identify sources of information that provide evidence of a particular person's skill from the requisite skill set;
determine a level of evidence that each of the sources of information provides regarding the particular person's skill from the requisite skill set;
graph data that describe skill sets held by the other workers onto a team skill topology map, wherein the team skill topology map comprises a skill icon surrounded by one or more skill dots, wherein the skill icon represents the requisite skill set that will be needed at the future time by the project team, wherein the one or more skill dots represent said each of the sources of information describing the particular person's skill from the requisite skill set, and wherein a distance between the skill icon and a particular skill dot represents the level of evidence of the particular person's skill from the requisite skill set, such that sources of information that are depicted by skill dots that are close to the skill icon are predetermined to provide stronger evidence of the particular person's skill than sources of information that are depicted by skill dots that are farther away from the skill icon than the skill dots that are close the skill icon;
identify the requisite skill set by identifying an unpopulated area on the team skill topology map;
receive historical data that describe antecedent conditions for a historical worker, wherein the antecedent conditions have been predetermined to have caused the historical worker to obtain the requisite skill set;
retrieve a candidate worker's skill set binary data that identify a current skill set of a candidate worker;

identify skill set enhancers that are made available to members of the project team in response to joining the project team, wherein the skill set enhancers comprise work experience and mentoring from other members of the project team that are provided by working on the project;
retrieve, from one or more biometric sensors coupled to the candidate worker, physiological responses generated in response to the candidate worker being asked particular questions related to the project;
identify an interest level for the project by the candidate worker based on the physiological responses generated in response to the candidate worker being asked the particular questions related to the project, wherein the interest level is determined by comparing the physiological responses from the candidate worker with known physiological responses to the particular questions related to the project;
identify stated interests of the candidate worker by comparing the physiological responses from the candidate worker with the known physiological responses, wherein the physiological responses from the candidate worker and the known physiological responses are produced by biometric sensors that monitor workers, and wherein the known physiological responses are produced by known responses to questions regarding the stated interests of the candidate worker;
combine the current skill set of the candidate worker with the skill set enhancers and the stated interests of the candidate worker to generate a predicted future skill set of the candidate worker;
in response to matching the requisite skill set to the predicted future skill set of the candidate worker, generate a recommendation that the candidate worker be presently added to the project team.

13. A system comprising:
one or more biometric sensors coupled to a candidate worker; and
a central processing unit (CPU), a computer readable memory, and a computer readable storage media with program instructions stored thereon causing the CPU to:
  determine a requisite skill set that will be needed in a future time by a project team, wherein the project team comprises workers on a project, and wherein the requisite skill set is not presently needed by the project team determining the requisite skill set by:
    identifying a final product of a current project;
    locating a past project that produced a same final product as the current project;
    identifying all past requisite skill sets used by the past project to produce said same final product; and
    determining the requisite skill set that will be needed at the future time by the current project team by identifying which skill set, from said all past requisite skill sets, is absent from current skill sets that are currently held by members of the current project team;
  identify sources of information that provide evidence of a particular person's skill from the requisite skill set;
  determine, by the processor, a level of evidence that each of the sources of information provides regarding the particular person's skill from the requisite skill set;
  graph data that describe skill sets held by the other workers onto a team skill topology map, wherein the team skill topology map comprises a skill icon surrounded by one or more skill dots, wherein the skill icon represents the requisite skill set that will be needed at the future time by the project team, wherein the one or more skill dots represent said each of the sources of information describing the particular person's skill from the requisite skill set, and wherein a distance between the skill icon and a particular skill dot represents the level of evidence of the particular person's skill from the requisite skill set, such that sources of information that are depicted by skill dots that are close to the skill icon are predetermined to provide stronger evidence of the particular person's skill than sources of information that are depicted by skill dots that are farther away from the skill icon than the skill dots that are close the skill icon;
  identify the requisite skill set by identifying an unpopulated area on the team skill topology map;
  receive historical data that describe antecedent conditions for a historical worker, wherein the antecedent conditions have been predetermined to have caused the historical worker to obtain the requisite skill set;
  retrieve a candidate worker's skill set binary data that identify a current skill set of the candidate worker;
  identify skill set enhancers that are made available to members of the project team in response to joining the project team, wherein the skill set enhancers comprise work experience and mentoring from other members of the project team that are provided by working on the project;
  retrieve, from said one or more biometric sensors coupled to the candidate worker, physiological responses generated in response to the candidate worker being asked particular questions related to the project;
  identify an interest level for the project by the candidate worker based on the physiological responses generated in response to the candidate worker being asked the particular questions related to the project, wherein the interest level is determined by comparing the physiological responses from the candidate worker with known physiological responses to the particular questions related to the project;
  identify stated interests of the candidate worker by comparing the physiological responses from the candidate worker with the known physiological responses, wherein the physiological responses from the candidate worker and the known physiological responses are produced by biometric sensors that monitor workers, and wherein the known physiological responses are produced by known responses to questions regarding the stated interests of the candidate worker;
  combine the current skill set of the candidate worker with the skill set enhancers and the stated interests of the candidate to generate a predicted future skill set of the candidate worker;
  in response to matching the requisite skill set to the predicted future skill set of the candidate worker, generate a recommendation that the candidate worker be presently added to the project team.

* * * * *